United States Patent
Lee et al.

(10) Patent No.: US 7,293,961 B2
(45) Date of Patent: Nov. 13, 2007

(54) ZIGZAG COOLED TURBINE AIRFOIL

(75) Inventors: Ching-Pang Lee, Cincinnati, OH (US); Aspi Rustom Wadia, Loveland, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 150 days.

(21) Appl. No.: 11/294,218

(22) Filed: Dec. 5, 2005

(65) Prior Publication Data

US 2007/0128034 A1 Jun. 7, 2007

(51) Int. Cl.
*F01D 5/18* (2006.01)

(52) U.S. Cl. .................. 416/96 R; 416/97 R; 415/115

(58) Field of Classification Search ................ 415/115, 415/116; 416/96 R, 97 R, 90 R
See application file for complete search history.

(56) References Cited

U.S. PATENT DOCUMENTS

| | | | |
|---|---|---|---|
| 5,156,526 A | 10/1992 | Lee et al. | |
| 5,165,852 A | 11/1992 | Lee et al. | |
| 5,246,340 A | 9/1993 | Winstanley et al. | |
| 5,356,265 A | 10/1994 | Kercher | |
| 5,387,085 A | 2/1995 | Thomas et al. | |
| 5,484,258 A | 1/1996 | Isburgh et al. | |
| 5,591,007 A | 1/1997 | Lee et al. | |
| 5,603,606 A | 2/1997 | Glezer et al. | |
| 5,660,524 A | 8/1997 | Lee et al. | |
| 5,690,472 A | 11/1997 | Lee | |
| 5,704,763 A | 1/1998 | Lee | |
| 5,813,835 A | 9/1998 | Corsmeier et al. | |
| 5,820,337 A | 10/1998 | Jackson et al. | |
| 5,967,752 A | 10/1999 | Lee et al. | |
| 6,126,396 A | 10/2000 | Doughty et al. | |
| 6,168,381 B1 | 1/2001 | Reddy | |
| 6,183,198 B1 | 2/2001 | Manning et al. | |
| 6,832,889 B1 | 12/2004 | Lee et al. | |
| 6,984,103 B2 * | 1/2006 | Lee et al. .................... | 415/115 |
| 2005/0111977 A1 | 5/2005 | Lee et al. | |
| 2005/0226726 A1 | 10/2005 | Lee et al. | |

OTHER PUBLICATIONS

U.S. Appl. No. 10/824,283, filed Apr. 14, 2004, by Chin-Pang Lee et al.

* cited by examiner

*Primary Examiner*—Edward K. Look
*Assistant Examiner*—Dwanye J White
(74) *Attorney, Agent, or Firm*—William S. Andes; Francis L. Conte

(57) ABSTRACT

A turbine airfoil includes pressure and suction sidewalls spaced apart to define flow channels extending in span and separated by ribs. Side channels are disposed along one sidewall and spaced from the opposite sidewall by the ribs, and a mid channel bridges the sidewalls. The side and mid channels are arranged in a zigzag serpentine cooling circuit alternating therebetween for transferring heat from the sidewall into the mid channel.

26 Claims, 3 Drawing Sheets

ZIGZAG COOLED TURBINE AIRFOIL

BACKGROUND OF THE INVENTION

The present invention relates generally to gas turbine engines, and, more specifically, to turbine airfoil cooling.

In a gas turbine engine, air is pressurized in a compressor and mixed with fuel in a combustor for generating hot combustion gases. Energy is extracted from the gases in a high pressure turbine (HPT) followed in turn by a low pressure turbine (LPT). The HPT drives the compressor, and the LPT drives an upstream fan in a typical turbofan aircraft engine application.

The HPT first receives the hottest combustion gases from the combustor and must be suitably cooled for ensuring a suitable useful life thereof. The turbine stage includes a turbine stator nozzle disposed at the exit of the combustor for first receiving and guiding the combustion gases therefrom. The nozzle includes a row of hollow stator vanes mounted between outer and inner bands.

The nozzle vanes direct the combustion gases through the first stage of turbine rotor blades extending radially outwardly from a supporting rotor disk. Each turbine blade includes an airfoil over which the combustion gases flow, which are bound by a platform disposed at the root of the airfoil. The platform is joined to a supporting dovetail that mounts the individual turbine blades in corresponding dovetail slots formed in the perimeter of a supporting rotor disk.

Both the stator vanes and rotor blades are hollow and provided with corresponding cooling circuits therein for channeling pressurized air bled from the compressor for cooling these components against the high heat load generated by the hot combustion gases during operation.

The corresponding airfoil configurations of the nozzle vanes and turbine blades are different for the specialized aerodynamic performance thereof. And, the vanes and blades are configured differently and mounted differently for their different operation in the stator nozzle and rotor disk.

Accordingly, the prior art of turbine airfoil cooling for both nozzle vanes and rotor blades is quite crowded, sophisticated, and esoteric for addressing the fundamental differences between vanes and blades and their operating environments in the gas turbine engine for maximizing cooling performance thereof over their varying configurations.

The typical airfoil of both the nozzle vanes and turbine blades includes a generally concave pressure side and an opposite, generally convex suction side extending chordally between opposite leading and trailing edges, and extending radially across the longitudinal span thereof. Each nozzle vane is mounted at its opposite radial ends to corresponding outer and inner bands. Each turbine blade is mounted at its dovetail end to the perimeter of the rotor disk, with the radially outer tip end of the airfoil extending freely in close proximity to the surrounding turbine shroud.

The nozzle vanes and rotor blades accordingly require different cooling circuits therein for the different configurations thereof and the different operating environments to maximize the cooling performance of the limited compressor bleed air channeled therethrough. And, the turbine blades experience the additional complication of rotation during operation which introduces centrifugal forces on the cooling air and secondary Coriolis forces due to the secondary direction of flow turning inside the rotating blades.

Nevertheless, nozzle vanes and turbine blades share similar cooling features such as radially extending flow passages, internal turbulators for heat transfer, film cooling holes arranged in multiple radial rows or columns over the pressure sidewall or suction sidewall, or both, and additional trailing edge outlets for discharging the spent cooling air.

Film cooling is a common cooling practice in which the cooling air is discharged from inside the airfoil in thin films that provide a thermally insulating air blanket over the external surface of the airfoils for protection from the surrounding hot combustion gases.

Inside the corresponding airfoils, impingement cooling techniques may be provided for impingement cooling selected locations of the internal surface of the airfoil against the high heat loads found outside the airfoil. And, the various cooling circuits in the airfoil are typically arranged in independent circuits specifically dedicated for different portions of the airfoil between the leading and trailing edges thereof and along the different pressure and suction sidewalls.

The internal dividing ribs in the airfoils that define the corresponding flow channels are themselves cooled by the cooling air channeled through the flow channels. The pressure and suction sidewalls of the airfoil are directly subjected to the external hot combustion gases which causes them to operate at elevated temperature.

In contrast, the internal ribs are protected from the external combustion gases by the sidewalls themselves and operate at substantially lower temperatures.

Accordingly, the different operating temperatures of the external sidewalls of the airfoils and their internal ribs correspondingly create differential temperatures therebetween that in turn create thermal stress.

Both the nozzle vanes and turbine blades are subject to such differential thermal stress, as well as additional stress from the pressure forces of the combustion gases themselves. And, the turbine blades are additionally subject to centrifugal stress from rotating the blades during operation.

Accordingly, the design of turbine nozzle vanes and rotor blades is remarkably complex with the temperature and stress distribution varying substantially over the opposite pressure and suction sides, both in chord between the leading and trailing edges thereof and radially over the longitudinal span.

And, the temperature and stress also vary in complex distributions inside each turbine airfoil along the corresponding ribs therein that define the various flow channels and flow circuits in each airfoil.

The durability and life of the individual turbine airfoil is therefore limited by the maximum temperature and maximum stress exhibited anywhere over the complex configuration of the airfoil, both outside and inside, which leads to the accumulation of thermal fatigue damage over extended operation in a gas turbine engine.

Accordingly, it is desired to further improve the cooling configuration of a turbine airfoil for further improving its durability and life.

BRIEF DESCRIPTION OF THE INVENTION

A turbine airfoil includes pressure and suction sidewalls spaced apart to define flow channels extending in span and separated by ribs. Side channels are disposed along one sidewall and spaced from the opposite sidewall by the ribs, and a mid channel bridges the sidewalls. The side and mid channels are arranged in a zigzag serpentine cooling circuit alternating therebetween for transferring heat from the sidewall into the mid channel.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
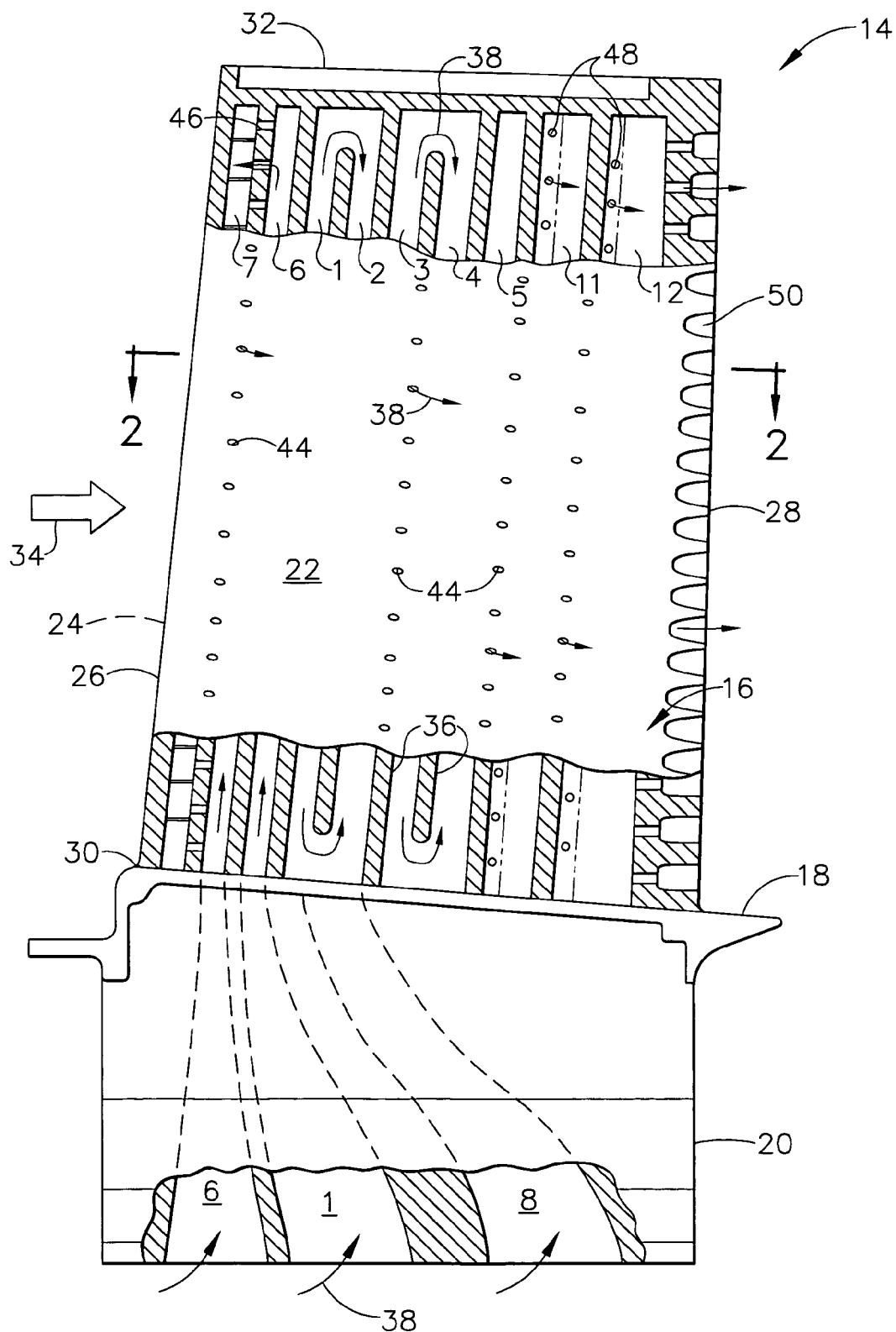
FIG. 1 is a partly sectional, elevation view of a gas turbine engine turbine rotor blade in accordance with an exemplary embodiment.

Illustrated in FIG. 1 is a turbine rotor blade 14 specifically configured for the first stage in the HPT of a gas turbine engine. The blade includes an airfoil 16, platform 18, and supporting dovetail 20 integrally joined together in turn in a unitary or one-piece casting.

The dovetail 20 has a conventional axial-entry configuration with corresponding lobes or tangs configured for mounting the blade in a corresponding dovetail slot in the perimeter of a turbine rotor disk (not shown).

The airfoil 16 includes a generally concave pressure sidewall 22, and a circumferentially opposite, generally convex suction sidewall 24. As additionally shown in FIG. 2, the two sidewalls extend axially in chord between opposite leading and trailing edges 26,28, and extend radially in span from a root 30, at the junction of the airfoil with the platform, to a radially outer tip 32.

During operation, combustion gases 34 are generated in a combustor (not shown) in the engine and discharged through a first stage turbine nozzle (not shown) for flow over the airfoils 16 of a full row of turbine blades 14 mounted to the perimeter of the supporting rotor disk. Energy is extracted from the combustion gases by the turbine airfoil 16 for rotating the supporting turbine rotor, which in turn rotates the compressor (not shown) of the engine.

Figure 2:
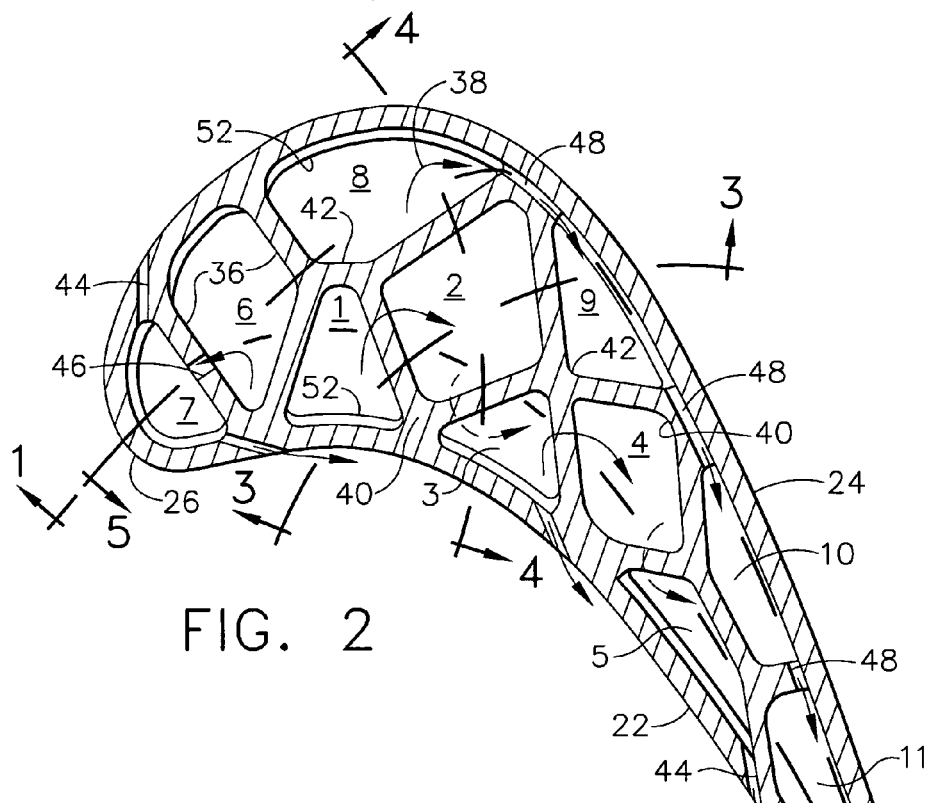
FIG. 2 is a radial sectional view of the airfoil illustrated in FIG. 1 and taken along line 2-2.

FIGS. 1 and 2 illustrate that the opposite sidewalls 22,24 of the turbine airfoil are spaced laterally apart between the leading and trailing edges to define a plurality of cooling flow channels 1-12 extending in radial span inside the airfoil and separated by corresponding walls or ribs 36. Pressurized cooling air 38 is suitably bled from the compressor and channeled through the turbine blade into the corresponding flow channels for cooling the blade during operation against the heat loads from the combustion gases 34 that flow over the external surface of the two sidewalls.

The internal ribs 36 extend radially over the longitudinal span of the airfoil from root to tip as well as laterally or transverse between the pressure and suction sidewalls 22,24 for dividing the hollow airfoil into a multitude of the flow channels 1-12 for preferentially cooling the different portions of the airfoil over the entire pressure and suction sides thereof, from root to tip, and between the leading and trailing edges. The various ribs 36 cooperate to bridge the opposite sidewalls of the airfoil and provide structural integrity of the hollow airfoil in cooperation with enhanced cooling thereof.

More specifically, the various flow channels of the airfoil illustrated in section in FIG. 2 include side channels 1,3,5 disposed directly inside or along the inner surface of the pressure or port sidewall 22 and spaced laterally from the opposite suction or starboard sidewall 24 at corresponding ones of the ribs 36.

Correspondingly, the flow channels also include additional side channels 8,9,10 disposed directly inside or along the inner surface of the suction sidewall 24 and spaced laterally from the opposite pressure sidewall 22 at corresponding ones of the internal ribs 36.

The port and starboard side channels extend only in part from their respective sidewalls of the airfoil and terminate inside the airfoil near the camber line disposed midway between the two sidewalls. The half-size side channels cooperate with one or more substantially larger or full-size middle or center channels 2,4 that bridge both pressure and suction sidewalls 22,24 for channeling the cooling air 38 through the several flow channels.

For example, the several flow channels may be configured in several independent cooling circuits specifically configured for cooling the different portions of the airfoil differently under the different heat loads and centrifugal stress. In a first cooling circuit, the side and middle, or mid, channels 1-5 are arranged in flow series in a laterally zigzag serpentine cooling circuit alternating laterally between the side and mid channels for transferring sidewall heat from the combustion gases into the mid channels 2,4.

Typically, the concave pressure sidewall 22 of the turbine airfoil is subject to the greatest heat loads from the combustion gases, and therefore operates at a correspondingly high temperature. The zigzag serpentine cooling circuit 1-5 utilizes the corresponding lateral zigzag configuration of the partition ribs 36 to preferentially conduct away heat laterally from the hot pressure sidewall, while preferentially channeling the cooling air in the zigzag serpentine cooling circuit for reducing differential temperature between the internal ribs and external pressure sidewall, and enhancing durability and life of the turbine blade.

Furthermore, the zigzag serpentine cooling circuit preferentially cooperates with the Coriolis force acting on the cooling air being channeled through the serpentine circuit for improving its cooling effectiveness inside the several flow channels of the circuit.

FIG. 2 illustrates a preferred configuration of the many ribs 36 which integrally join the sidewalls for separating the different flow channels 1-12. In particular, the ribs 36 join the pressure and suction sidewalls 22,24 at corresponding outer junctions or nodes 40, and extend laterally inwardly from the sidewalls to join each other at corresponding inner junctions or nodes 42. Several inner nodes 42 are illustrated in FIG. 2 and are disposed generally along the camber line of the airfoil spaced midway between the opposite sidewalls 22,24.

The two exemplary mid channels 2,4 join in flow communication the exemplary port side channels 1,3,5 between corresponding inner and outer nodes 40,42 for providing complementary advantages in cooling and in thermal stress.

For example, the outer nodes 40 are directly joined to the corresponding sidewalls and provide efficient heat conduction paths laterally inwardly from the sidewalls to the interior of the airfoil where the cooling air is circulated in the flow channels. The inner nodes 42 are located in the center of the airfoil far removed from the external source of heat loads. And, the mid channels 2,4 are separated in most part from the external sidewalls by the cooperating side channels 1,3,5, 8-10.

In the preferred embodiment illustrated in FIGS. 1 and 2, The port side channels 1,3,5 are disposed directly inside the pressure sidewall 22 in major part or length between the leading and trailing edges of the airfoil which is subject to high heat loads from the combustion gases during operation.

Correspondingly, the zigzag serpentine cooling circuit is arranged in a three-pass circuit including a side first channel 1 disposed inside the pressure sidewall 22 followed in turn by a mid second channel 2 which is yet followed in turn by a side third channel 3 also disposed inside the pressure sidewall.

The zigzag serpentine circuit on the pressure side of the airfoil is preferably further arranged in a five-pass circuit which further includes a mid fourth channel 4 following in turn the third channel 3, and a side fifth channel 5 following in turn the fourth channel 4. In this way, the five flow channels 1-5 are joined in flow communication end-to-end to define the corresponding five-pass zigzag serpentine circuit having sharp zigzag lateral turns side to side between the opposite sidewalls of the airfoil, as well as sharp turns radially at the tip and root of the airfoil, as the cooling air flows aft between the leading and trailing edges in the compound laterally and radially circuitous serpentine path inside the pressure sidewall.

The five serpentine channels 1-5 are illustrated in side view in FIG. 1 and extend over the full radial span of the airfoil between the root 30 and the tip 32. The corresponding ribs 36 in the five flow channels alternately terminate just below the airfoil tip and just above the platform to provide corresponding flow turns between the various channels where the primary direction of the cooling air changes from radially outward to radially inward, and vice versa.

Figure 3:
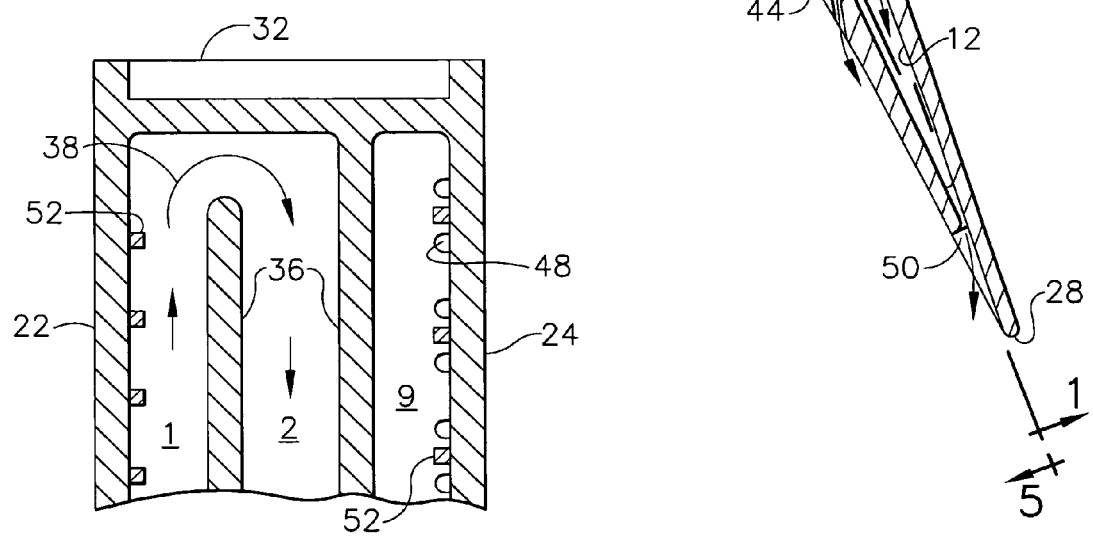
FIG. 3 is an elevational sectional view of the tip portion of the airfoil illustrated in FIG. 2 and taken along line 3-3.

FIG. 3 illustrates in sectional view the shorter rib 36 between the first and second channels 1,2 that effects a flow bend for turning the cooling air 38 radially inwardly into the second channel from the first channel.

Figure 4:
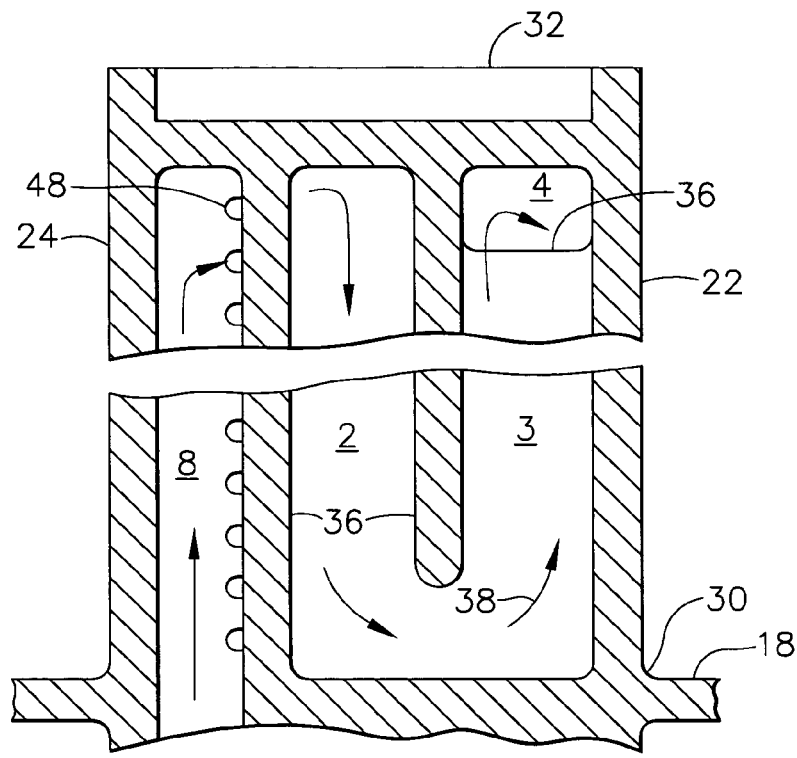
FIG. 4 is an elevational sectional view of the airfoil illustrated in FIG. 2 and taken along line 4-4.

FIG. 4 similarly illustrates in sectional view the commencement of the short rib 36 between the second and third channels 2,3 spaced above the plane of the platform 18 for providing another flow bend to turn the cooling air radially outwardly into the third channel 3 from the second channel 2.

From the third flow channel 3 illustrated in FIGS. 1,2,4, the air again is turned through a corresponding flow bend found at the top of the short rib 36 separating the third and fourth channels 3,4. And FIG. 1 shows the bottom end of the short rib 36 between the fourth and fifth channels 4,5 which is spaced above the plane of the platform 18 for defining the final flow bend for yet again changing the direction of the cooling air radially outwardly into the fifth channel 5 from the fourth channel 4.

The various ribs 36 defining the five flow channels 1-5 are preferably imperforate for channeling substantially all of the cooling air through the five flow channels in series. However, various radial rows or columns of film cooling holes 44 in any conventional configuration may be formed in the pressure sidewall 22 for providing outlets for one or more of the various flow channels including the five channels 1-5.

For example, a row of film cooling holes 44 extends through the pressure sidewall at the aft end of the third flow channel 3 and is inclined aft below the corresponding outer node to discharge a portion of the cooling air from the first circuit for film cooling the external surface of the pressure sidewall. Additionally, another row of film cooling holes 44 is disposed at the aft end of the fifth channel 5 and is inclined aft toward the trailing edge to provide additional film cooling of the pressure sidewall in this region.

A significant advantage of the first serpentine cooling circuit 1-5 is the preferential compound zigzag configuration thereof. The cooling air flows through the five channels 1-5 in turn, beginning with the first channel 1 immediately following the leading edge 26 of the airfoil which is subject to high heat loads from the combustion gases outside the pressure sidewall. As the air cools this portion of the pressure sidewall outside the first channel 1 it picks up heat therefrom and is correspondingly warmed.

This warmed air from the outer side channel 1 is then channeled into the inner mid channel 2 for heating the otherwise cold ribs 36 thereof. The cooling air from the second channel 2 then flows through the side channel 3 where again it absorbs heat from this portion of the pressure sidewall, with the warmed cooling air again being channeled inside the airfoil to the second mid channel 4 for in turn warming the otherwise cold ribs 36 which bound this channel.

Finally, the cooling air from the fourth channel 4 flows through the last side channel 5 in the first circuit for cooling this region of the pressure sidewall prior to being discharged through the row of film cooling holes 44 which then provide film cooling of the pressure sidewall aft therefrom.

By alternately channeling the cooling air laterally from the outer side channels 1,3 into the corresponding inner mid channels 2,4, heat from the pressure sidewall is efficiently channeled inside the airfoil for warming the internal ribs 36 surrounding the mid channels 2,4 and correspondingly reducing the differential temperature between the external pressure sidewall and the internal ribs.

This reduction in differential temperature between the pressure sidewall and the internal ribs improves the uniformity of temperature distribution across the metal airfoil and correspondingly reduces thermal stresses therein.

Furthermore, since the turbine blade rotates on the rotor disk with the suction sidewall 24 leading the pressure sidewall 22, the mid channels 2,4 correspondingly lead in rotational movement the corresponding first and third side channels 1,3 from which they receive their cooling air in turn. Since the cooling air has mass and is subject to centrifugal acceleration and force during operation, the air is also subject to secondary Coriolis acceleration or force due to the vector product of the changing direction of the cooling air between the various radial flow channels 1-5. The leading positions of the mid channels 2,4 utilize the Coriolis force to advantage for improving heat transfer between the cooling air in these passages and their surrounding partitions or ribs 36.

FIG. 2 illustrates a preferred configuration of the inner and outer nodes 40,42 formed by the corresponding junctions of the several ribs 36 with each other and with the opposite pressure and suction sidewalls. The ribs 36 may extend obliquely in pairs laterally outwardly from the airfoil center to join the pressure and suction sidewalls 22,24 at corresponding ones of the outer nodes 40. For example, two outer nodes 40 are found on the pressure side between channels 1,3 and channels 3,5; and two more outer nodes 40 are found on the suction side between channels 8,9 and channels 9,10.

Each of the two mid channels 2,4 is correspondingly bounded by four of the ribs 36 joined in pairs to the opposite sidewalls 22,24 by two corresponding outer nodes 40. The four ribs 36 bounding each mid channel 2,4 are also joined together in pairs by two of the inner nodes 42 on opposite sides thereof along the camber line.

The four ribs 36 bound each of the two mid channels 2,4 to preferably effect a quadrilateral configuration, with a generally diamond profile bridging the two sidewalls 22,24, and with two outer nodes and two inner nodes at the four corners of the diamond configuration.

Correspondingly, the two side channels 1,3 which feed in turn the two diamond profiled mid channels 2,4 have complementary triangular profiles, with the long bases thereof bridging the outer nodes 40 along the sidewalls, and the apexes thereof being disposed at the inner nodes 42.

The oblique configuration of the partition ribs 36 between the side channels 1,3,5 and the cooperating mid channels 2,4 enjoys many advantages including creating the preferred zigzag flowpath laterally between the five channels 1-5, and promoting direct heat conduction from the outer nodes 40 through the ribs to the corresponding inner nodes 42.

Furthermore, the mid channels 2,4 are relatively large and preferably have larger flow area than the side channels 1,3,5 which improves the casting yield of the turbine blades during manufacture, and further enhances heat transfer performance. Since the side channels have smaller flow areas than the mid channels, the cooling air is channeled therethrough at a higher velocity than in the mid channels for increasing heat transfer and heat withdrawal from the pressure sidewall, while decreasing heat transfer and cooling of the mid channels 2,4 to correspondingly increase their temperature and reduce differential temperature with the sidewalls.

As indicated above, the various internal ribs 36 illustrated in FIG. 2 are configured to define a multitude of flow channels 1-12 inside the airfoil, preferably arranged in one embodiment in three independent cooling circuits separated from each other by imperforate ribs. The zigzag serpentine circuit 1-5 described above defines the first circuit in the airfoil disposed directly inside the pressure sidewall 22 and spaced between the leading and trailing edges 26,28.

A second cooling circuit defined by corresponding flow channels 6,7 is disposed directly at or behind the leading edge 26, between the leading edge 26 and the first circuit 1-5. And a third circuit defined by flow channels 8-12 is disposed chordally behind the second circuit 6-7 and laterally behind the first circuit 1-5 directly inside the suction sidewall 24.

Figure 5:
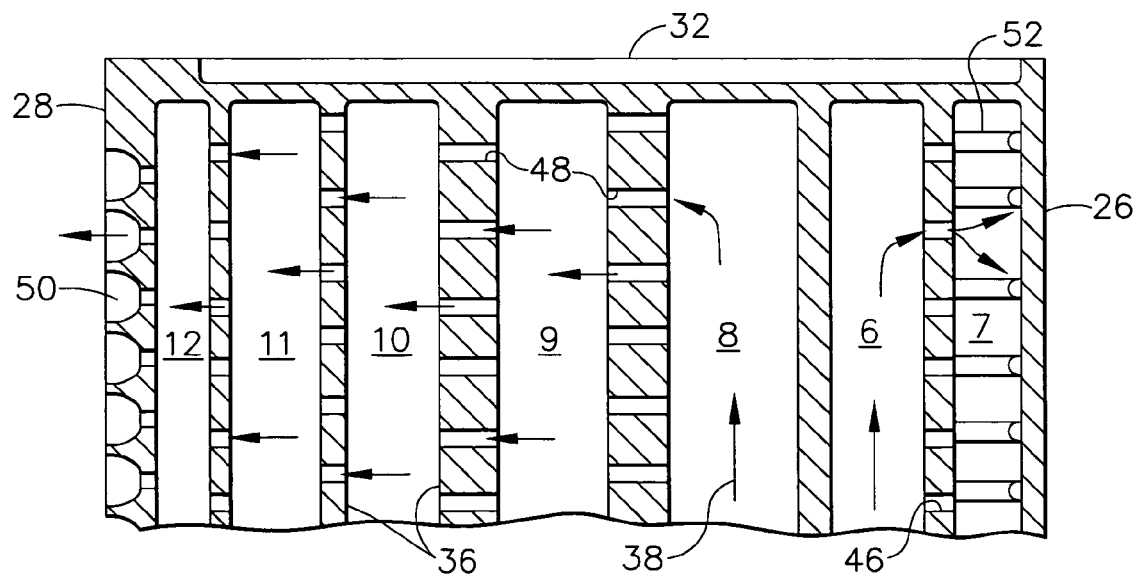
FIG. 5 is a sectional view of the suction side of the airfoil illustrated in FIG. 2 at the tip end thereof and taken along line 5-5.

The second circuit is illustrated in FIGS. 1,2, and 5 and includes two parallel flow channels 6,7 separated by a perforate one of the ribs 36 having a row of impingement holes 46 distributed over the radial span of the rib. This second impingement cooling circuit 6-7 may have an otherwise conventional configuration with air being supplied in the sixth channel 6 and flowing through the row of impingement holes 46 into the seventh channel 7 for impingement cooling the back side of the leading edge 26.

The seventh channel 7 may include one or more rows of additional film cooling holes 44 which provide outlets for this circuit and channel the spent cooling air in cooling air films along both the pressure and suction sidewalls in the preferred embodiment.

FIGS. 1,2,5 illustrate a preferred configuration of the third cooling circuit including a plurality of parallel flow channels 8-12 spaced apart chordally by corresponding ones of the ribs 36. The ribs 36 in this circuit include corresponding vertical rows of cooling shear holes 48 extending chordally through the junctions of the ribs with the suction sidewall 24 for channeling the cooling air 38 in shear along the inner surface of the suction sidewall in the several flow channels.

The third cooling circuit is best illustrated in FIGS. 2 and 5 and includes five flow channels 8-12 disposed in part laterally and chordally behind the first circuit 1-5, and between the second circuit 6-7 and the trailing edge 28. The first four channels 8,9,10,11 include corresponding rows of the shear holes 48 in the corresponding ribs 36 therebetween for in turn channeling the same cooling air in sequence from the eighth channel 8 to the twelfth channel 12 prior to discharge through a row of trailing edge outlet slots 50 having any conventional configuration along the thin trailing edge of the airfoil.

As shown in FIG. 2, the zigzag first circuit 1-5 is disposed laterally behind the third shear circuit 8-12 and shares corresponding internal nodes therewith, such as the two internal nodes 42 at the forward ends of the two mid channels 2,4. Since the heat load on the suction side of the airfoil is typically less than the heat load on the pressure side of the airfoil, the shear cooling circuit 8-12 provides less cooling than the serpentine circuit 1-5 and promotes the uniformity of temperature across the two sides of the airfoil through the corresponding grid of internal ribs 36 therein. The two common mid channels 2,4 complement the different cooling capability of the first circuit 1-5 on the pressure side of the airfoil and the third circuit 8-12 on the suction side of the airfoil.

Since the three circuits illustrated in FIGS. 1 and 2 are preferably independent from each other, they each include a corresponding inlet flow channel 1,6,8 which are preferably grouped directly together behind the leading edge 26 in the maximum width or hump region of the airfoil 16. The three inlet channels 1,6,8 extend through the platform 18 and dovetail 20 to the base of the dovetail for receiving the pressurized cooling air 38 in a conventional manner from the compressor.

The relatively cool compressor air 38 channeled through the three inlets 1,6,8 is then initially received in the widest portion of the airfoil within about the first quarter of the chord length from the leading edge for maximizing cooling effectiveness in this wide region. From here, the cooling air is distributed forwardly through the second circuit 6,7 for preferentially cooling the leading edge region of the airfoil. And, the air is also distributed aft through the corresponding first circuit 1-5 and third circuit 8-12 for separately cooling the opposite pressure and suction sides of the airfoil with complementary internal cooling of the network of crossing ribs 36 found therein.

The spent cooling air from the three circuits is suitably discharged through the corresponding sidewalls through the various rows of film cooling holes 44 and trailing edge outlet slots 50. Since the fifth channel 5 terminates upstream from the trailing edge 28 and forward of the last two channels 11,12 of the third cooling circuit, an additional row of film cooling holes 44 may be located at the aft end of the eleventh channel 11 through the pressure sidewall for re-energizing the cooling air film deployed from the first cooling circuit as shown in FIG. 2.

The turbine airfoil disclosed above may include additional conventional features where warranted for enhancing cooling effectiveness of the limited supply of pressurized cooling air 38. For example, conventional turbulators 52 which provide small protuberances along the inside of the pressure sidewall, or suction sidewall, or both, may be introduced into one or more of the flow channels as desired for locally enhancing heat transfer of the cooling air.

In the preferred embodiment, the side channels 1,3,5 on the pressure sidewall of the airfoil may include rows of the turbulators 52 extending in chord along the inner surface of the pressure sidewall and spaced apart along the span thereof.

In contrast, the cooperating mid channels 2,4 are preferably smooth along the bounding ribs 36 thereof and intentionally devoid of any turbulators. In this way, the heat transfer in the channels 1,3,5 may be increased, while the heat transfer in the mid channels 2,4 may be decreased.

Accordingly, cooling of the pressure sidewall 22 within the coverage of the zigzag serpentine cooling circuit may be locally increased, while cooling inside the mid channels 2,4 may be decreased for correspondingly increasing the operating temperature of the surrounding ribs 36 thereof. Differential temperature between the internal ribs and the external pressure sidewall may therefore be reduced for correspondingly reducing thermally induced stress.

The preferential introduction of the small side channels 1,3,5,8-10 enhances cooling of the respective sidewalls of the airfoil. The three side channels 1,3,5 on the pressure side of the airfoil cooperate with the larger internal mid channels 2,4 in the preferred zigzag serpentine cooling circuit described above for further enhancing cooling performance of the limited air, and are complemented by the cooling performance of the third circuit along the suction sidewall which shares the common mid channels 2,4 with the zigzag cooling circuit on the pressure sidewall.

The multiple flow channels illustrated in section in FIG. 2 are still sufficiently large for being conventionally cast in a unitary casting of the entire turbine blade in conventional practice. Three corresponding ceramic cores may be used to fabricate the three independent cooling circuits within the airfoil with an effective casting yield of the turbine blades.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:
    an airfoil joined at a root thereof to a platform in turn joined to a supporting dovetail;
    said airfoil having three independent cooling circuits including a zigzag serpentine first circuit being disposed in part inside along a pressure sidewall of said airfoil and chordally behind an impingement second circuit at the leading edge of said airfoil, and laterally behind a shear third circuit disposed inside along an opposite suction sidewall; and
    said first circuit includes multiple side flow channels along said pressure sidewall alternating with a mid flow channel bridging said pressure and suction sidewalls.

2. A blade according to claim 1 wherein:
    said airfoil includes a plurality of ribs defining corresponding flow channels of said three circuits extending in span from said root to an outer tip of said airfoil; and
    each of said three circuits includes a corresponding inlet flow channel grouped directly together behind said leading edge in the maximum width of said airfoil, and respective outlet holes through said sidewalls, and said inlet channels extend through said platform and dovetail to the base thereof for receiving cooling air.

3. A blade according to claim 2 wherein said ribs join said sidewalls at outer nodes and extend inwardly therefrom to join each other at inner nodes, and said mid channel joins in flow communication with said side channels between corresponding inner and outer nodes.

4. A blade according to claim 3 wherein said ribs extend obliquely in pairs outwardly to join said sidewalls at corresponding outer nodes, and inwardly from said sidewalls to join together at corresponding inner nodes.

5. A blade according to claim 4 wherein said serpentine circuit is arranged in a three-pass circuit including a side first channel disposed inside said pressure sidewall followed in turn by a mid second channel and followed in turn by a side third channel also disposed inside said pressure sidewall.

6. A blade according to claim 5 wherein said mid channel is bounded by four of said ribs joined to opposite sidewalls by two of said outer nodes and joined together by two of said inner nodes.

7. A blade according to claim 6 wherein:
    said mid channel has a generally diamond profile bridging said sidewalls; and
    said side channels have triangular profiles, with bases bridging said outer nodes, and apexes at said inner nodes.

8. A blade according to claim 7 wherein said serpentine circuit is arranged in a five-pass circuit further including a mid fourth channel following in turn said third channel, and a side fifth channel following in turn said fourth channel.

9. A blade according to claim 8 wherein said second circuit comprises two flow channels separated by a perforate rib for impingement cooling said leading edge from inside said airfoil.

10. A blade according to claim 9 wherein:
    said third circuit includes five flow channels disposed laterally and chordally behind said first circuit between said second circuit and said trailing edge; and
    said ribs in said third circuit include corresponding rows of cooling shear holes at the junctions with said suction sidewall.

11. A turbine airfoil comprising:
    opposite pressure and suction sidewalls extending in chord between opposite leading and trailing edges, and spaced apart therebetween to define a plurality of flow channels extending in span and separated by corresponding ribs;
    said flow channels including side channels, disposed inside one of said sidewalls and spaced from the opposite sidewall by said ribs, and a mid channel bridging both sidewalls for channeling cooling air through said airfoil; and
    said side and mid channels being arranged in a zigzag serpentine cooling circuit alternating between said side and mid channels for transferring sidewall heat into said mid channel.

12. An airfoil according to claim 11 wherein said ribs join said sidewalls at outer nodes and extend inwardly therefrom to join each other at inner nodes, and said mid channel joins in flow communication with said side channels between corresponding inner and outer nodes.

13. An airfoil according to claim 12 wherein said side channels are disposed directly inside said pressure sidewall.

14. An airfoil according to claim 13 wherein said serpentine circuit is arranged in a three-pass circuit including a side first channel disposed inside said pressure sidewall followed in turn by a mid second channel and followed in turn by a side third channel also disposed inside said pressure sidewall.

15. An airfoil according to claim 14 wherein said serpentine circuit is arranged in a five-pass circuit further including a mid fourth channel following in turn said third channel, and a side fifth channel following in turn said fourth channel.

16. An airfoil according to claim 12 wherein said ribs extend obliquely in pairs outwardly to join said sidewalls at corresponding outer nodes, and inwardly from said sidewalls to join together at corresponding inner nodes.

17. An airfoil according to claim 16 wherein said mid channel is bounded by four of said ribs joined to opposite sidewalls by two of said outer nodes and joined together by two of said inner nodes.

18. An airfoil according to claim 17 wherein said mid channel has a generally diamond profile bridging said sidewalls.

19. An airfoil according to claim 17 wherein said side channels have triangular profiles, with bases bridging said outer nodes, and apexes at said inner nodes.

20. An airfoil according to claim 12 wherein said ribs configure said flow channels in three independent cooling circuits including said zigzag serpentine circuit as a first circuit disposed inside said pressure sidewall spaced between said leading and trailing edges, a second circuit disposed between said leading edge and said first circuit, and a third circuit disposed chordally behind said second circuit and laterally behind said first circuit inside said suction sidewall.

21. An airfoil according to claim 20 wherein said second circuit comprises two flow channels separated by a perforate rib for impingement cooling said leading edge from inside said airfoil.

22. An airfoil according to claim 20 wherein said third circuit comprises a plurality of parallel flow channels spaced apart chordally by said ribs, and said ribs include corresponding rows of cooling shear holes at the junctions with said suction sidewall for channeling said cooling air in shear along the inner surface of said suction sidewall.

23. An airfoil according to claim 22 wherein said third circuit includes five flow channels disposed laterally and chordally behind said first circuit between said second circuit and said trailing edge.

24. An airfoil according to claim 23 wherein said first circuit includes three side channels alternating with two mid channel inside said pressure sidewall to define a five-pass zigzag serpentine circuit sharing corresponding inner nodes with said third circuit.

25. An airfoil according to claim 20 wherein each of said three circuits includes a corresponding inlet flow channel grouped directly together behind said leading edge in the maximum width of said airfoil.

26. An airfoil according to claim 20 wherein said side channels include turbulators along said sidewall and said mid channel is smooth along said ribs.

* * * * *